United States Patent [19]

Bestmann

[11] Patent Number: 5,641,244

[45] Date of Patent: Jun. 24, 1997

[54] REVETMENT, REVETMENT SYSTEM AND METHOD FOR THE BANKS OF WATERWAYS

[76] Inventor: Lothar Bestmann, Pinneberger, Strasse 203, D-22880, Wedel/Holst, Germany

[21] Appl. No.: 402,842

[22] Filed: Mar. 13, 1995

Related U.S. Application Data

[60] Continuation-in-part of Ser. No. 225,584, May 10, 1994, Pat. No. 5,425,597, which is a division of Ser. No. 43,272, Apr. 6, 1993, Pat. No. 5,338,131, which is a continuation-in-part of Ser. No. 886,693, May 21, 1992, abandoned.

[51] Int. Cl.⁶ ................. E02B 3/12; E02B 3/08
[52] U.S. Cl. ................. 405/16; 405/15; 405/21
[58] Field of Search ............... 405/15, 16, 18–21, 405/29–35; 47/83

[56] References Cited

U.S. PATENT DOCUMENTS

| | | | |
|---|---|---|---|
| 627,375 | 6/1899 | Zanetti | 405/16 |
| 1,165,194 | 12/1915 | Maccaferri | 405/16 |
| 4,394,924 | 7/1983 | Zaccheroni | 405/16 X |
| 4,726,708 | 2/1988 | Papetti | 405/16 X |
| 5,368,410 | 11/1994 | Ferraiolo | 405/15 X |

FOREIGN PATENT DOCUMENTS

| | | | |
|---|---|---|---|
| 0204207 | 11/1983 | Japan | 405/16 |
| 405118016 A | 5/1993 | Japan | 405/16 |
| 001783042 A1 | 12/1992 | Russian Federation | 405/15 |

OTHER PUBLICATIONS

Bestmann, Lothar, *Water and Soil*, "Praktische Verwendung lebender Baustoffe und technische Moglichkeiten", Year 36, vol. 1, Jan., 1984.

Hoeger, Sven, *Soil and Water Conservation*, "Schwimmkampen–Germany's artificial floating islands", vol. 43, No. 4, Jul.–Aug., 1988, pp. 304–306.

Bestmann, Lothar, outline of presentation to U.S. Army Corps of Engineers, Lake Eufula, OK, Apr., 1990.

Bestmann, Lothar, "Biological Engineering Methods of Shore Protection", Apr., 1991.

Bestmann Green Systems, "Bioengineering for Erosion Control, Water Quality, and Habitat Restoration", Feb., 1992.

Bestmann Green Systems, "Bioengineering with Bestmann Green Systems", Mar., 1992.

Goldsmith, Wendi, *Land and Water*, "Working with Nature to Stabilize Shorelines", Nov./Dec., 1991.

*Primary Examiner*—Dennis L. Taylor
*Attorney, Agent, or Firm*—Richard P. Crowley

[57] ABSTRACT

The invention relates to a revetment and a revetment system and method for the protection of the banks of water courses, canals, flowing and still water bodies or the like. The revetment consists of chambers with a net-like encasement on all sides, filled with particulate substrate material and bound together into a single unit.

31 Claims, 4 Drawing Sheets

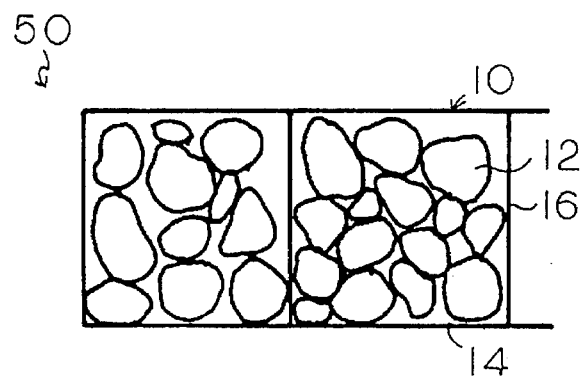
FIG.1
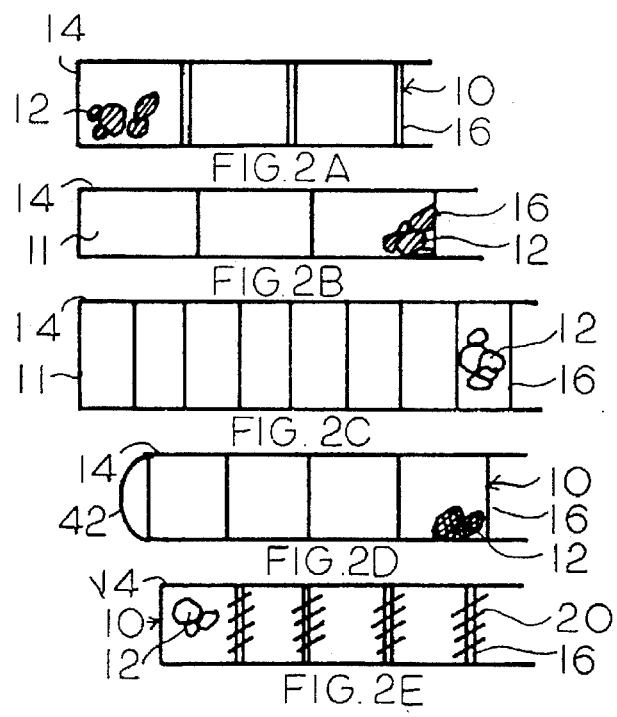
FIG.2A
FIG.2B
FIG.2C
FIG.2D
FIG.2E
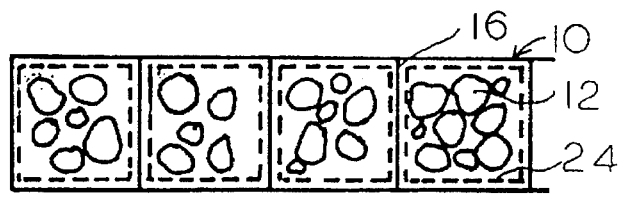
FIG.3A
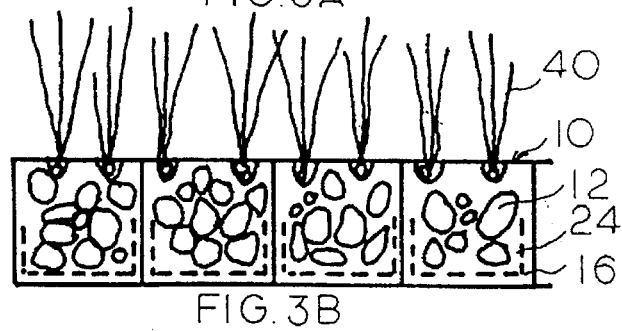
FIG.3B

REVETMENT, REVETMENT SYSTEM AND METHOD FOR THE BANKS OF WATERWAYS

REFERENCE TO PRIOR APPLICATIONS

This application is a continuation-in-part of patent application U.S. Ser. No. 08/225,584, filed May 10, 1994, now U.S. Pat No. 5,425,597 issued Jun. 20, 1995 hereby incorporated by reference, which application is a divisional application of U.S. patent application Ser. No. 08/043,272, filed Apr. 6, 1993, now U.S. Pat. No. 5,338,131, issued Aug. 16, 1994, which application is a continuation-in-part of U.S. Ser. No. 07/886,693, filed May 21, 1992, now abandoned, and which application claims priority from European patent application EPA92105015.9, filed Mar. 24, 1992. Also, this continuation-in-part application is based on and claims priority from German patent application P44 08 651.2, filed Mar. 14, 1994.

BACKGROUND OF THE INVENTION

The banks of navigable artificial or natural flowing or standing water bodies, such as rivers, canals, and also dams, retention basins, outlet troughs (spillways), etc., must generally be protected from erosion, for which rock revetments with or without clamps, or compound rock revetments are generally used.

When canals are to be built, or waterways are to be widened and/or deepened to accommodate larger ships, banks are, as a rule, excavated. This has the disadvantage that not only does substantial quantities of earth on the bank have to be dug up, but also that the deposition of this earth mass in the proximity of the site, in order to hold down costs, is often not possible. Above all, the work expenditure is large, because of the substantial quantities of earth that have to be moved to ensure a natural angle of repose.

To achieve steeper banks with significantly less earth removal, sheet pilings are often erected on the bank. Apart from the fact that the sheet pilings are cumbersome and expensive, they are also foreign features in the environment. People have, therefore, attempted to hide the sheet pilings by introducing swimming and vegetative fascines, which improve the appearance, but results in added expense.

It is therefore desirable to provide a new and improved revetment, a revetment system and a method to protect banks wherein these well known, cumbersome methods of bank widening can be avoided, and the task of creating widened and stable bank zones is achieved by simple, more natural means, without over-designing and expensive work investment.

SUMMARY OF THE INVENTION

The invention relates to a revetment and a revetment system and method for the protection of the banks of water courses, canals, flowing and still water bodies and the like.

The invention comprises a revetment adapted for use on a bank for the protection of waterways or the like, and which revetment comprises in combination a plurality of chambers, generally but not necessarily of the same size and shape; the exterior of the chambers formed by a plastic, noncorrodible, nonbiodegradable net-like like encasement material. The chambers may be individually formed and secured together to form a desired revetment unit of a selected number of chambers, wherein the chambers contain therein a substrate filling material of sufficient size to be retained within the chamber by the net-like encasement material. In another embodiment, the chambers are formed in revetment units with the chambers having a shared transverse wall, thus comprising an integral revetment chamber unit.

The invention includes a revetment system which comprises a waterway having a bank, which waterway is desired to be protected by the use of a revetment system, and which system comprises a plurality of substrate filled chambers formed of a plastic, net-like encasement material, the chambers bound together in a selected revetment unit of sufficient size and shape, in position and optionally secured on the bank of the waterway to provide protection for the waterway.

The invention also comprises a method for the production and use of revetments for the protection of waterways furnished by the use of revetments, which revetment chambers are constructed with a net-like encasement, and the chambers bound in a preselected arrangement, open at the top and filled from above with substrate filling material. The chambers are subsequently closed by the network encasement material, and brought filled to the installation site in construction-ready condition.

Where applicable, the method includes means such as stake or bottom plate anchor means for anchoring the revetments in position on the bank.

Revetments, composed of a plurality of chambers, may have shared transverse walls or may have multiple chambers with the transverse walls of each chamber bound together by lacing or by a cable, such as steel cables. Chambers may also include base plates on the bottom of the chamber, for example, and optionally may have filter liners, such as fibrous layers of woven or non-woven geotextile material within the chambers, and placed between the net-like encasement material on the exterior surface and the substrate filling material. This fibrous layer provides a separation between the bottom of the chambers from the substrate.

The particulate substrate filling or packing material employed within the chambers could be the same or different for different chambers, and may be comprised of material such as humus, sand, crushed gravel, stone, coconut fibers, synthetic fibers and varying mixtures thereof. The substrate filler material is environmentally acceptable and generally nonbiodegradable, which includes coir material that is non-corrodible in the environment in which it is employed. If a rock-type substrate filling material is used, the rock-type may be of varying grain sizes or uniform as desired.

One or more of the chambers of the revetment may be secured to and used together in combination with fiber rolls, which fiber rolls may be connected to the exterior net-like encasement material of the chambers which is accomplished by, but not limited to, the braiding together of the casement of the network about the fiber rolls with the net-like encasement material of the chambers. One or more fiber rolls may be placed or secured between lateral or vertical rows of the chambers, typically with the longitudinal axis of the fiber rolls generally arranged parallel to and optionally secured adjacent to the exterior surface of the chambers. The fiber rolls may comprise tubular or generally cylindrical rolls of coir or coir-like material with an outer coarse net material about the entire surface, by at least the cylindrical or tubular surface, to retain the coir or coir-like material in the desired fiber roll form.

The fiber rolls may contain therein, either extending from the one or both ends or radially extending outward therefrom, various aquatic or other shrubs or plants as required, particularly a plurality of precultivated emergent aquatic plants. Where the fiber roll is a solid cylindrical shape, the fiber roll may contain an outer vegetative carrier material like the coir or coir-like material to support and maintain the tubular form, and then contain therein other vegetative carrier material such as humus, peat, soil, gravel, stones and the like, alone or in combination with plants. The revetments, with the chambers and the fiber rolls of the chambers, may be placed on banks or embankments as desired, and in the desired position or arrangement, and often are secured in position with the use of stakes, anchors, cables or mesh about or secured to the chambers and the fiber rolls.

The net-like encasement material suitable for use to form the chambers of the revetments may have openings, which may vary in size or shape, and may be a rectangular shape, and generally the openings are small enough in size and shape to retain the substrate filing material within the chamber. Typically, the size of the net-like encasement material may vary, for example, from about 1×1 up to 6×6 inches in dimension. Structurally, the net-like encasement material is formed by a noncorrosive, nonbiodegradable, sturdy plastic coired or rope-like material, such as extruded strands or multiple strands rather than wire or wire mesh material, which would tend to corrode and degrade during use. The net-like encasement material may have the net-like openings formed through the employment of knots at the intersections to define the openings, or the net-like encasement material may be formed by interbraiding together the strands of ropes at the intersections of the opening, so that the openings are formed free of knots. This permits the formation of an interbraided, flexible encasement material without the use of knots, which material may be resistant to high stress when filled with substrate filling material. The chambers of the revetment may be of the same or different size or shape, but generally are of the same shape, and typically are square, and may be filled with substrate filing material either off-site or on-site as required.

The revetment, according to the invention, consists of chambers, with a net-like encasement on all sides, filled with particulate substrate material and bound together into a single unit. Through such mutual stabilization of the chambers by the substrate material, movement of the revetment is unlikely to occur, even under large waves or water movements. Thus, a stable bank, with an arbitrarily steep bank, can be established using the revetment without necessitating the movement of a large quantity of earth.

One important element of the revetment is its high flexibility, which adapts to the given unconformities on the bed, and can also adapt to the changes of morphology as a result of slumping and settling of the bed, since the relatively small grain size of the filling substrate material, will not form any resistant arches, as the larger grain sizes of the well-known gabions can.

The chambers with filling can thereby be more or less tall and thin or short and thick or any combination thereof. Multiple chambers can rest on top of each other, lie next to each other, be stacked as a trapezoid, or be otherwise placed to achieve a desirable form. In the preferred installation arrangement, the chambers can be formed using the net-like encasement which has transverse wall or partitions to separate the filling of multiple chambers. It is most important that the substrate filling in the chambers not be significantly moved through any wave movement or bed adjustments. To this end, the additional lacing together of the chambers has proved effective. To assure even more stability in the revetment invention, chambers can be connected with a steel cable, which steel cable may then be anchored into the bank. Further stability can be achieved through the use of additional base plates on the bottom of the lowermost chambers. These base plates are rectangular, square or otherwise shaped slabs made of wood, metal, hard plastic or concrete and are inserted in the bottom of the encasement to provide structure in cases where a flat bottom, angular edges or a solid foundation is needed. A combination of steel cables and base plates may also be used as desired.

The revetment can maintain additional hold to the bank by being bound with anchors into the bank, or suspended by nets secured to the bank. The chambers of the revetment can be filled with various rock types of uniform or differing grain sizes. They can also contain all additional substrate filling consisting of a mixture of humus, sand, crushed stone, coconut fiber or synthetic fibers. In the latter case, it is practical to place a filter fabric between the chamber encasement and the substrate filling, It has also proved practical to connect the chambers with fiber rolls to achieve an ecologically functioning bank environment.

A particular advantage of the revetment and revetment system of the invention lies in the method in which it is produced. In the desired form, the prepared network of chambers, open on top, is filled from above with substrate, subsequently closed, and brought, thereafter, to the installation site in construction-ready condition.

The chambers of the revetments in the figures are either completely encased with a net-like material around the filling, wherein the chambers are subsequently bound together, or they are created by shared transverse walls or partitions which divide the filling within the larger, whole encasement.

The invention will be described for the purpose of illustration only in connection with certain embodiments; however, it is recognized that those persons skilled in the art may make various changes, modifications, additions or improvements to the illustrated embodiments without departing from the spirit and scope of the invention.

BRIEF DESCRIPTION OF THE DRAWINGS

FIG. 1 shows a partial sectional view of the revetment of the invention.

FIG. 2, A–E, shows a partial sectional view of a variety of arrangements of revetment chambers in revetment units.

FIG. 3 shows two partial side sectional views of a plurality of revetment chambers in revetment systems, with FIG. 3A having filter fabric on every side of the revetment, and FIG. 3B having filter fabric on the bottom and halfway up two sides of the revetment.

DESCRIPTION OF THE EMBODIMENTS

Figure 4A:
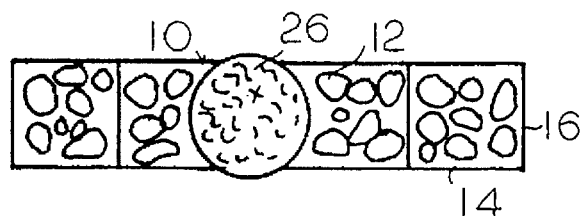
FIG. 4 shows a sectional view of the revetment chambers of the invention connected by fiber rolls, with FIG. 4A showing the chambers connected in the middle by one fiber roll and FIG. 4B showing the chambers connected in the middle and at both ends with fiber rolls.

In the drawings, FIG. 1 is an enlarged sectional cutaway detail of the revetment of the invention 50 with the revetment chamber 10 having a net-like encasement material 14 with particulate substrate filler material 12 connected at the shared transverse walls 16.

FIG. 2 shows selected configurations of the revetment chambers 10 according to desired use. In FIG. 2A, the chambers 10 are implemented in a quadratic form in completely separated encasements which are held together by the outer net-like encasement material 14. FIGS. 2B and 2C show cross-sections of a plurality of the revetment chambers in an elongated rectangular embodiment 11, with FIG. 2B showing the rectangular chambers 11 connected in a horizontal fashion, and FIG. 2C showing the rectangular chambers 11 connected in a vertical fashion. FIG. 2D shows a special-end construction of groups of chambers 10 with arcuate end-pieces 42. FIG. 2E shows the chambers 10 implemented in a quadratic form in completely separated encasements which are held together by lacing 20.

FIG. 3 shows the revetment chamber 10 in a revetment unit 50 having additional filter fabric 24. FIG. 3A shows the filter fabric 24 on all sides of the chamber 10, and FIG. 3B shows the filter fabric 24 on the bottom and extending halfway up the sides of the chambers 10. This filter fabric 24 is particularly advantageous when the particulate substrate matter 12 is fine-grained, such as humus, sand, or the like, in order to promote the colonization of plants. FIG. 3B shows vegetation 40 emerging from the particulate matter 12 within the revetment chambers 10.

Figure 4B:
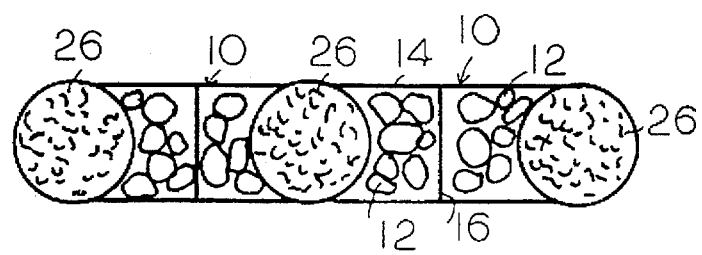

FIG. 4 shows the revetment chambers 10 with particulate substrate filler material 12 and transverse connecting walls 16 having fiber rolls 26 integrated into the chamber unit. FIG. 4A shows a fiber roll 26 between two revetment chamber units 10, and FIG. 4B shows a fiber roll 26 between two revetment chamber units 10, as well as two fiber rolls 26 on either end of the revetment chamber units 10.

Figure 5:
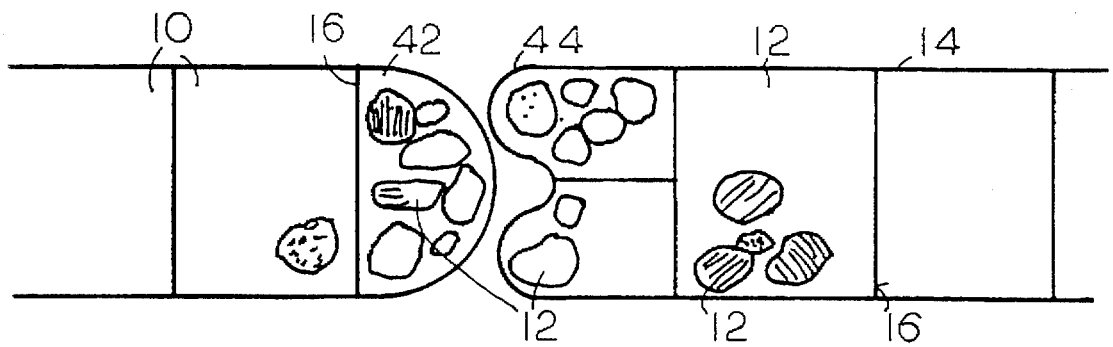
FIG. 5 shows a detailed sectional view of the execution of the end of the revetment chamber groups.

FIG. 5 shows a partial sectional view of two revetments 50 with contoured end-pieces 42 and 44 attached to the square revetment chambers 10. Contoured end-piece 42 is convex in shape, and contoured end-piece 44 is concave in shape. These end-pieces are constructed with interlocking contours to provide for less slippage of the revetments in use on a bank.

Figure 6:
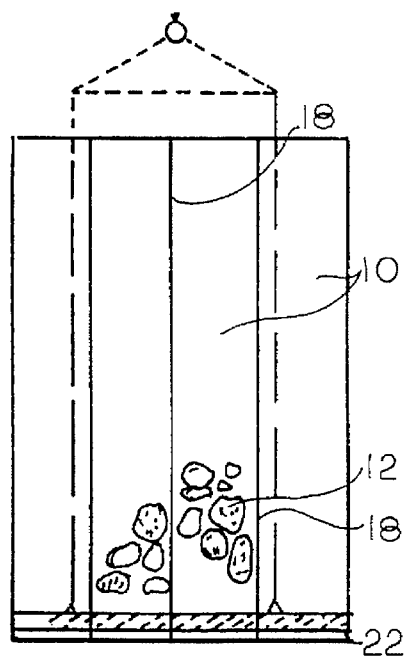
FIG. 6 shows a sectional view of the revetment chambers having steel cable and base plate attachments.

FIG. 6 shows the use of steel cables 18 and anchor plates 22 with the revetment chamber 10 for further stabilization of the unit as required. The steel cables, which are inserted through the particulate matter 12 and the encasement material 14, may also be used without the anchor plate 22. The base plates are rectangular, square or otherwise shaped slabs made of wood, metal, hard plastic or concrete and are inserted in the bottom of the encasement to provide structure in cases where a flat bottom, angular edges or a solid foundation is needed.

Figure 7A:
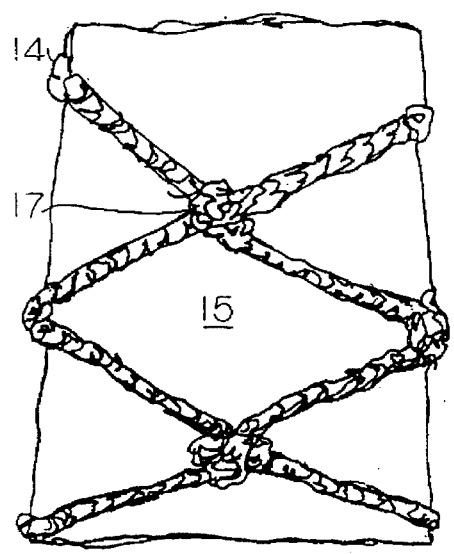
FIG. 7 shows in detail a portion of the net-like encasement material, with FIG. 7A showing the opening formed by knots, and FIG. 7B showing the openings formed by interbraiding.
Figure 7B:
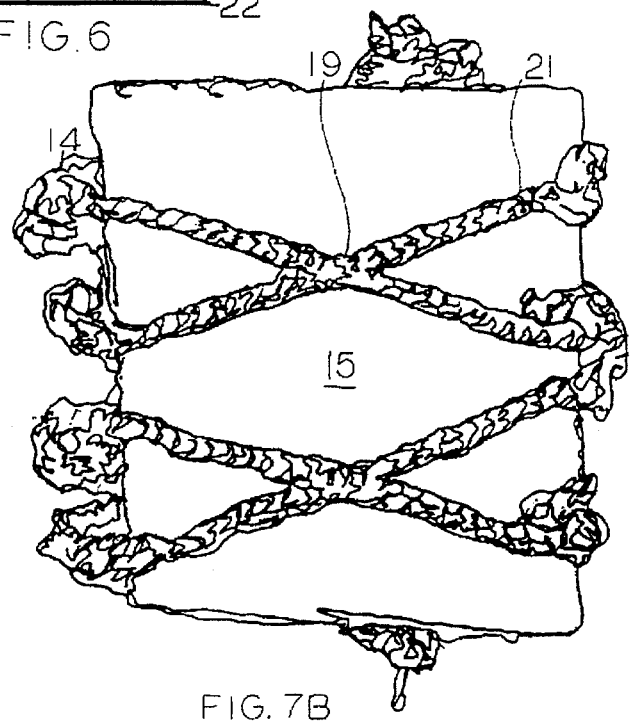

FIG. 7 shows in enlarged detail a portion of the net-like encasement material 14 with FIG. 7A showing the openings 15 formed by knotting 17 of the strands 21 and FIG. 7B showing the openings formed by interbraiding 19 of the strands. The interbraiding of the strands 21 provides for added strength and flexibility for the net-like encasement for response to stress placed upon the encasement by water turbulence from without and the substrate filler material within.

Figure 8:
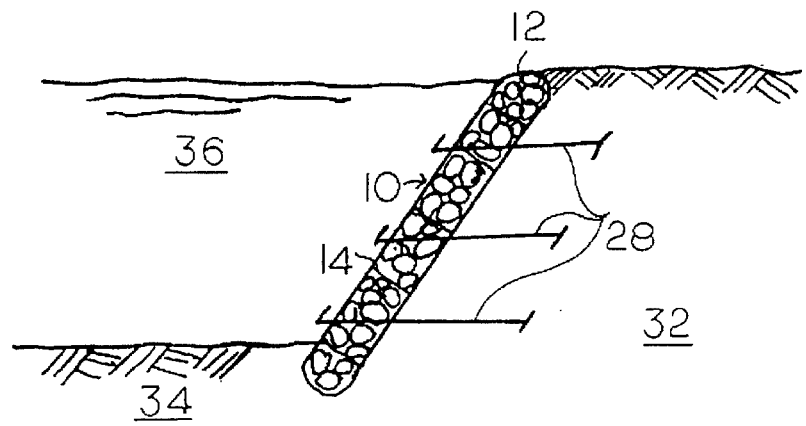
FIG. 8 shows the securing of the revetment system to a bank using an anchor.

FIG. 8 shows a revetment 50 in place against a bank 32 in a waterway 34 with the revetment chambers 10 having particulate matter 12 within the encasement material 14. Anchors 28 further secure the revetment 50 to the bank, for additional security where the water 36 may be especially turbulent.

Figure 9:
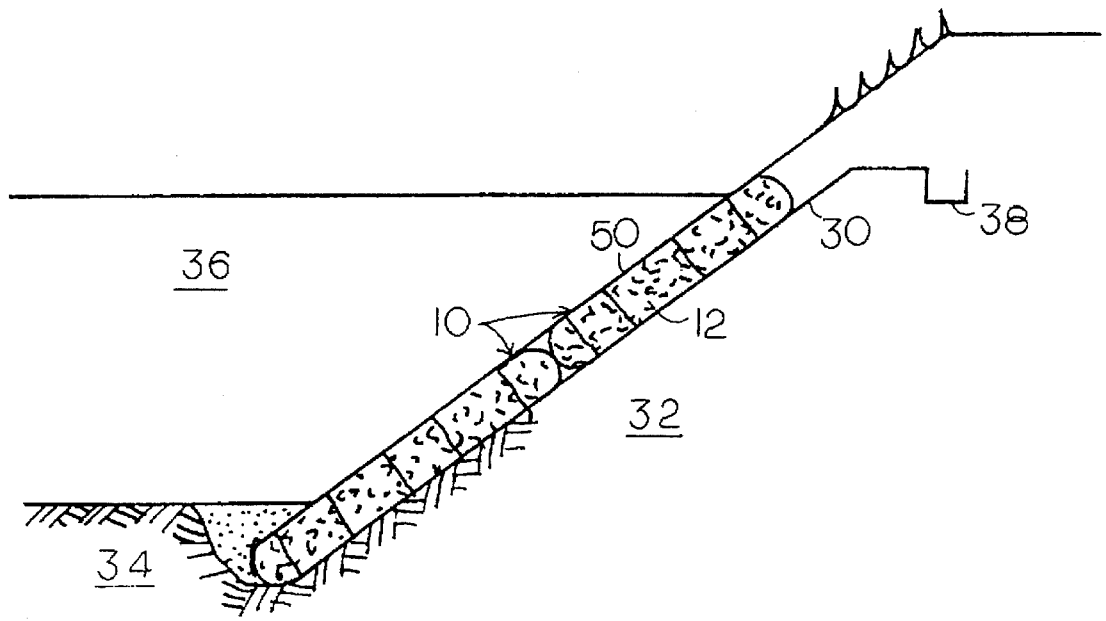
FIG. 9 shows the suspension of the revetment system of the invention secured to a bank by means of a net.

FIG. 9 shows the revetments 50 with revetment chambers 10 having particulate matter 12 therein and encased by encasement 14. These revetments 50 are placed in a waterway 34 against a bank 32 and are suspended by means of a mesh net 30 anchored at one end to the bank 32 by means of an anchor 38.

In operation, the revetment chambers 10 are formed from a net-like encasement 14, having a top and bottom and four sides. These chambers are filled with particulate substrate material 12, which material may be from a group of material consisting of humus, sand, crushed stone, coconut fiber, synthetic fiber, and mixtures thereof. When finer grained material is to be used, such as humus or sand, the chambers are lined either partially or totally with a filter fabric 24 to contain the material. The filter fabric material can be synthetic or biodegradable or nonbiodegradable material. These chambers are then bound together in a single unit 50, and placed on a bank 32 for stabilization purposes.

The revetments can be further secured by lacing the chambers together with lacing 20, and by anchoring the revetments by the use of steel cables 18, anchor plates 28, or mesh material 30 or any combination thereof as deemed necessary. The chambers can be filled to be either generally square or rectangular, being either tall and thin or short and thick or any combination thereof. The chambers are flexible and can be stacked or placed next to each other to form a wide variety of configurations to achieve an effective form in the protection of banks.

Thus, the revetment of the invention as shown and described is simple, more flexible, less cumbersome and more ecologically desirable for the stabilization and protection of waterway bank zones.

What is claimed is:

1. A revetment adapted for use on the bank of a waterway for the protection of the waterway, which revetment comprises:

a) a plurality of chambers having exterior walls, each chamber wall consisting essentially of a noncorrosive, nonbiodegradable, flexible, plastic, net-like extruded rope-like strand encasement material having net-like openings therein, and a means to secure together the chambers into a selected revetment unit;

b) the chamber containing therein particulate substrate filling material retained within the chambers by the net-like encasement material; and c) the plastic chamber revetment unit and filling material sufficiently flexible to permit said unit to conform to the morphological properties of the bank to be protected.

2. The revetment of claim 1 wherein the revetment comprises a plurality of adjacent, side-by-side chambers with shared transverse walls of the net-like encasement material, which partition the revetment chambers.

3. The revetment of claim 1 wherein the plurality of chambers are adjacent chambers secured together by means to lace together the chambers.

4. The revetment of claim 1 wherein the filling material permits the colonization of plants in the chambers, and at least one of which chambers includes plants extending from one surface thereof.

5. The revetment of claim 1 wherein at least one of the chambers has a bottom base plate.

6. The revetment of claim 1 wherein at least one of the chambers includes a geotextile material on the bottom surface between the encasement material and the substrate filling material, or a filter liner.

7. The revetment of claim 1 which includes a plurality of about 2 to 10 adjacent laterally arranged chambers.

8. The revetment of claim 1 which includes a cylindrically shaped fiber roll composed of vegetative carrier material secured to at least one chamber.

9. The revetment of claim 8 which include a plurality of fiber rolls secured to and between at least two or more chambers.

10. The revetment of claim 1 wherein the substrate filing material is selected from the group consisting of humus, sand, crushed stone, coconut fiber, synthetic fiber, and mixtures thereof.

11. The revetment of claim 1 wherein the chambers are generally rectangular in form and the chambers at each end of the revetment unit have arcuate sides.

12. The revetment of claim 1 wherein the net-like encasement material has net-like openings ranging from about 1×1 to 6×6 inches in dimension.

13. The revetment of claim 1 wherein the net-like encasement material is composed of plastic fiber material, with the net-like opening formed by interbraiding the fiber material together to form the intersection of the net-like openings.

14. The revetment of claim 1 wherein the means to secure comprises a steel cable about the chambers.

15. A revetment system which comprises:
   a) a waterway having a bank; and
   b) the revetment of claim 8 on the bank and conforming to the morphology of the bank to stabilize the bank of the waterway.

16. The system of claim 15 which includes means to secure the revetment unit to the bank.

17. A method for the protection of the bank of a waterway, which method comprises:
   a) providing a revetment unit adapted for use on the bank of a waterway for the protection of the waterway, which revetment unit comprises:
      i) forming a plurality of chambers having exterior walls, each chamber wall consisting essentially of a noncorrosive, nonbiodegradable, flexible, plastic, net-like extruded rope-like encasement material having net-like openings therein, and securing together the chambers for a selected revetment unit; and
      ii) retaining within the chambers by the net-like encasement material a particulate substrate filling material;
   b) constructing a plurality of plastic chambers of the revetment with open tops;
   c) filling through the open tops of the chambers with the substrate filling material;
   d) closing the open top of the filled chambers with a net-like encasement material;
   e) transporting the closed, filled revetment unit to the bank; and
   f) conforming the sufficiently flexible revetment unit to the morphological properties of the bank to be protected.

18. A revetment adapted for use on the bank of a waterway for the protection of the waterway, which revetment comprises:

a) a plurality of chambers, having exterior walls consisting essentially of a noncorrosive, nonbiodegradable, flexible, plastic net-like encasement material composed of rope-like extruded strands of plastic fiber material;
   b) the net-like openings ranging from about 1×1 to 6×6 inches in dimension and formed by interbraiding or knotting the fiber material together to form the intersection of the openings, and a means to secure together the chambers into a selected revetment unit;
   c) the chamber containing therein particulate substrate filling material retained within the chambers by the net-like encasement material; and
   d) the filling material selected from the group consisting of humus, sand, crushed stone, coconut fiber, synthetic fiber, and mixtures thereof.

19. The revetment of claim 18 which includes a plurality of solid cylindrical fiber rolls composed of a vegetative carrier material within an outer net-like material and secured to at least one chamber.

20. The revetment of claim 1 wherein the net-like encasement material comprises plastic fiber material with the net-like openings formed by the employment of knots at the intersection of the openings.

21. The revetment of claim 1 wherein at least two opposing chambers have portions configured to fit together.

22. The revetment of claim 21 wherein the opposing ends of the opposing chambers have a convex and a concave arcuate configuration arranged to fit together in a supporting mating relationship.

23. The revetment of claim 1 wherein the plurality of chambers are arranged in a stacked trapezoidal form.

24. The revetment of claim 9 wherein the fiber rolls comprise cylindrical or tubular rolls of coir-like material and which fiber rolls have an outer retaining coarse net material.

25. The revetment of claim 6 wherein the geotextile material extends upwardly on at least two sides of one or more chambers.

26. The revetment of claim 9 wherein one or more of the fiber rolls contain precultivated aquatic plants and vegetative carrier material.

27. The system of claim 18 which includes net means about the revetment unit to secure the revetment unit to a bank.

28. The system of claim 18 which includes a plurality of anchor means to secure the revetment unit to the bank.

29. The method of claim 17 which includes placing a filter fabric material within one or more chambers to contain the particulate substrate material therein.

30. The method of claim 17 which includes securing the revetment unit to the banks of the waterway.

31. The revetment system prepared by the method of claim 17.

* * * * *